W. WYSS.
AUTOMATIC TEMPERATURE REGULATOR.
APPLICATION FILED MAR. 23, 1918.
1,296,250.
Patented Mar. 4, 1919.
5 SHEETS—SHEET 1.
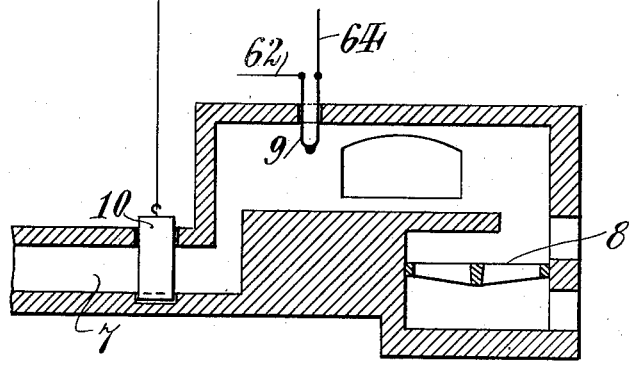
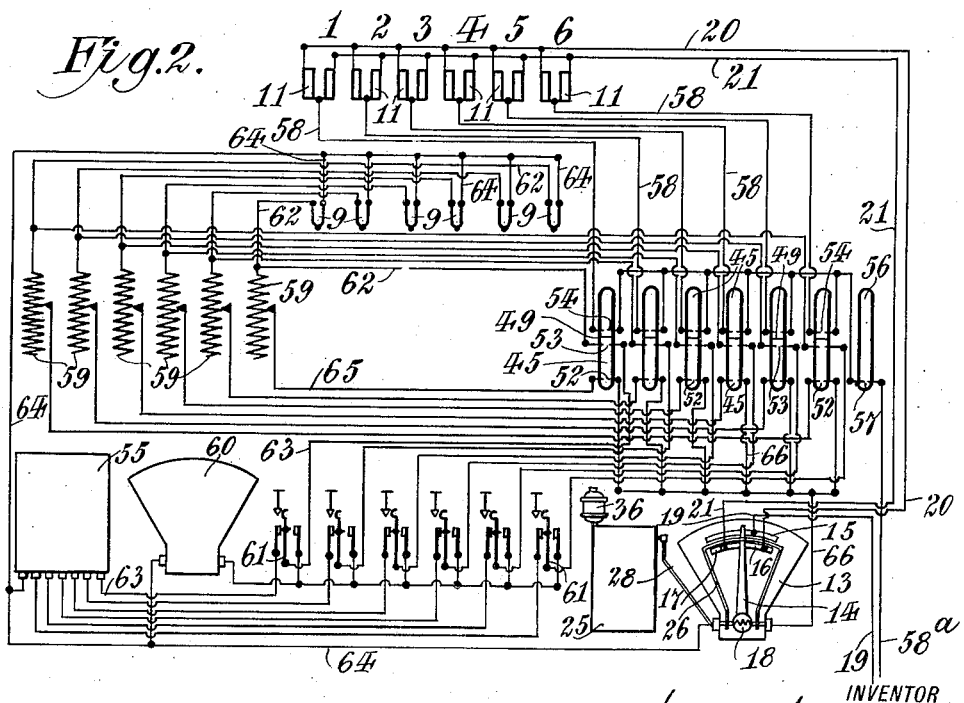
WITNESS:
INVENTOR
Walter Wyss
BY
Redding, Greeley & Goodlett
ATTORNEYS

W. WYSS.
AUTOMATIC TEMPERATURE REGULATOR.
APPLICATION FILED MAR. 23, 1918.

1,296,250.

Patented Mar. 4, 1919
5 SHEETS—SHEET 2.

W. WYSS.
AUTOMATIC TEMPERATURE REGULATOR.
APPLICATION FILED MAR. 23, 1918.
1,296,250.
Patented Mar. 4, 1919.
5 SHEETS—SHEET 3.
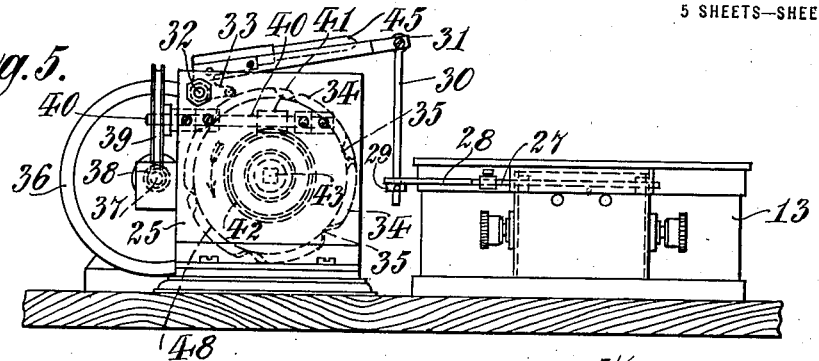
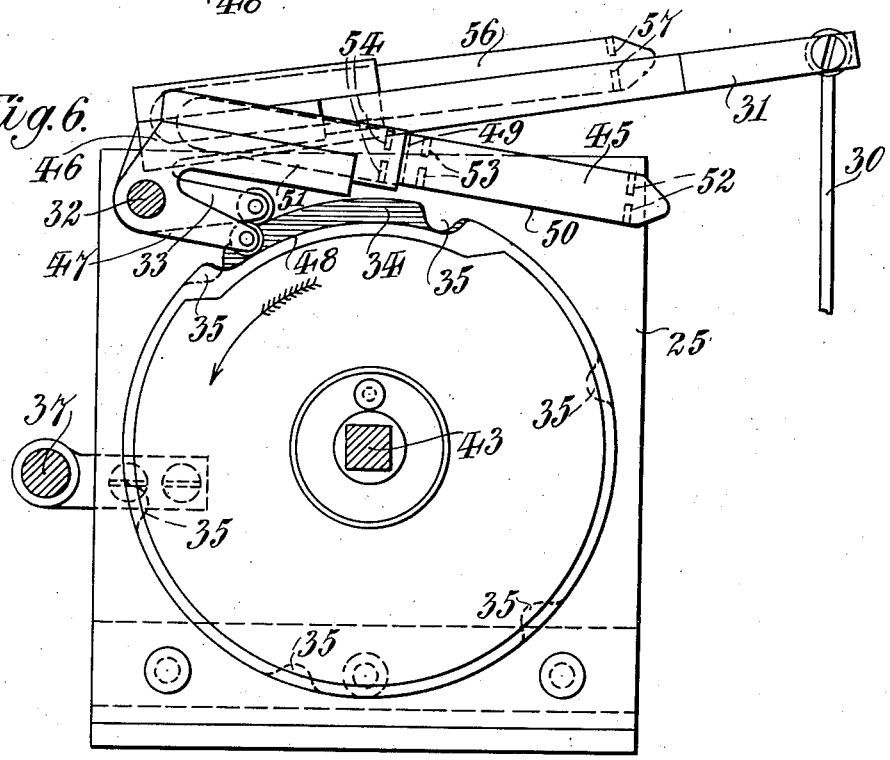
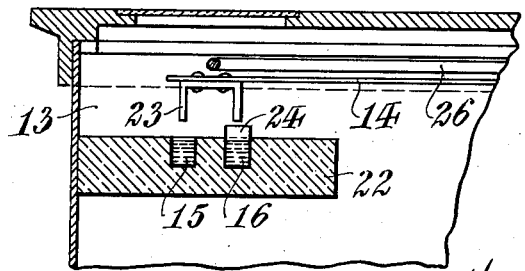

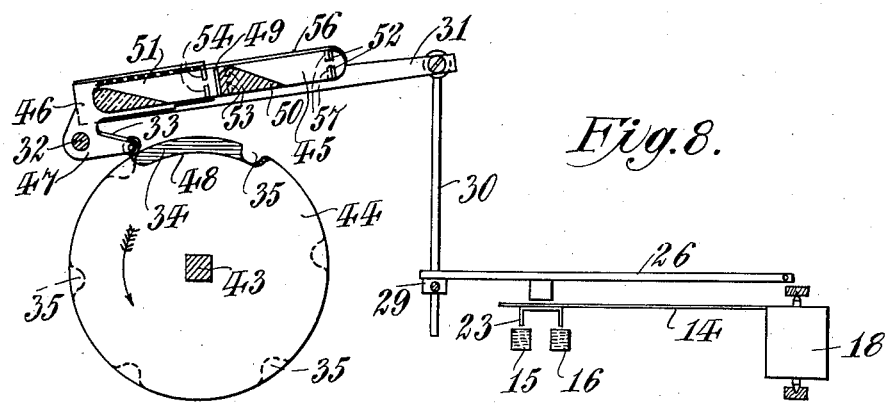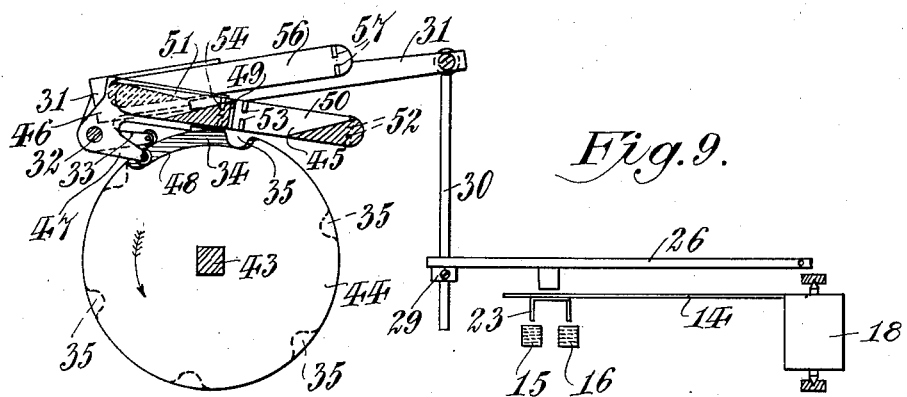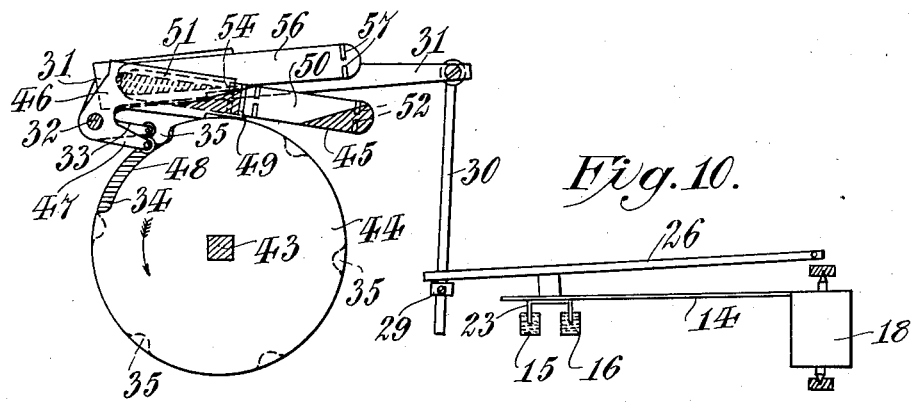

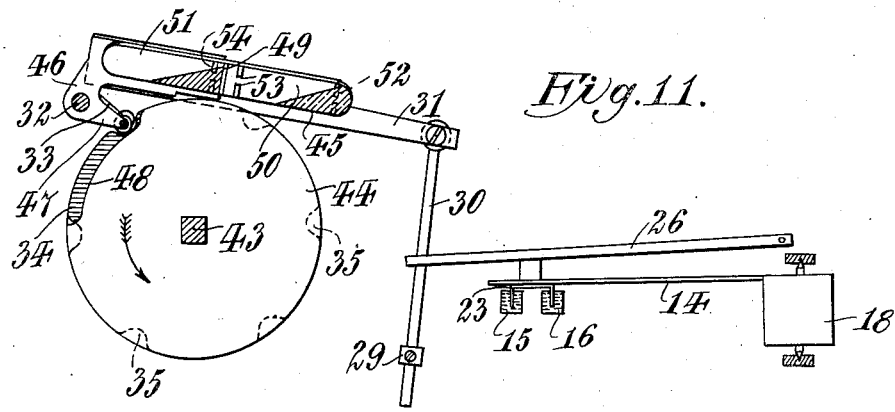
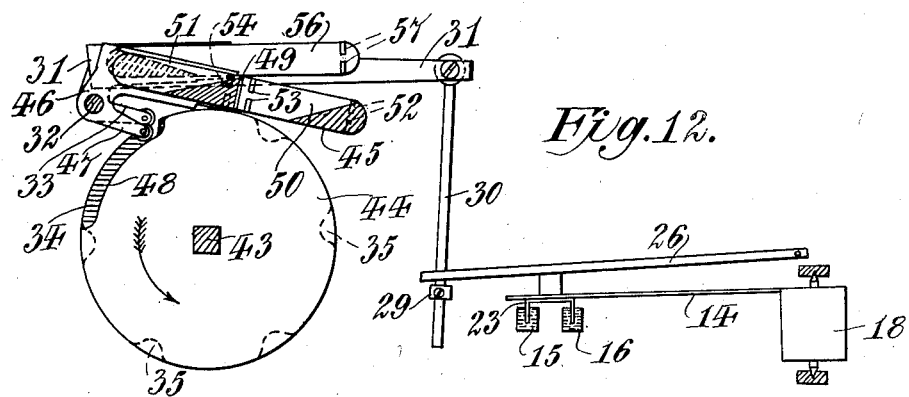
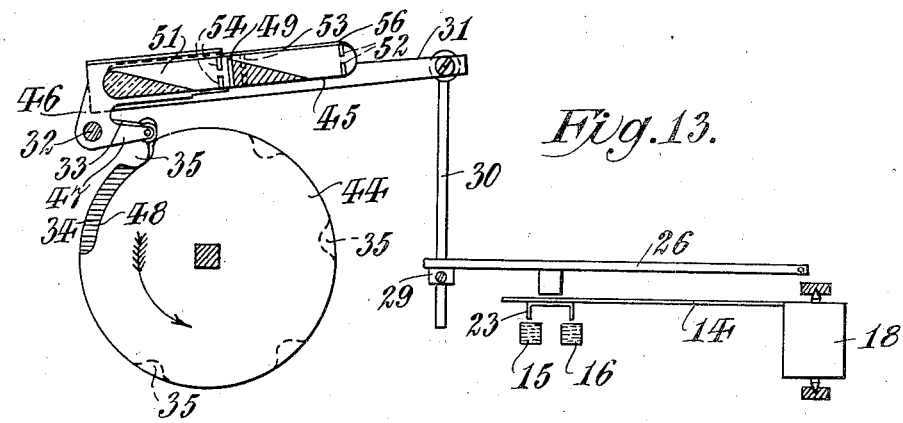

UNITED STATES PATENT OFFICE.

WALTER WYSS, OF ARBON, SWITZERLAND, ASSIGNOR TO FIRMA ADOLPHE SAURER, OF ARBON, SWITZERLAND.

AUTOMATIC TEMPERATURE-REGULATOR.

1,296,250.  Specification of Letters Patent.  Patented Mar. 4, 1919.

Application filed March 23, 1918. Serial No. 224,220.

*To all whom it may concern:*

Be it known that I, WALTER WYSS, a citizen of the Republic of Switzerland, residing in Arbon, Switzerland, have invented certain new and useful Improvements in Automatic Temperature-Regulators, of which the following is a specification, reference being had to the accompanying drawings, forming a part hereof.

In another application for Letters Patent of the United States Ser. No. 171,608 filed May 29, 1917, there is shown and described an electrically controlled and operated automatic temperature regulator, adapted for the control of the temperature of a single furnace and in which a thermoelectric couple or element acts, through a light, auxiliary current, to control the supply of a heavier current to the motor which operates the furnace damper or draft slide and thereby regulates the temperature of the furnace. By the present invention it is sought to provide means whereby a plurality of furnaces or other sources of heat can be placed under the temperature control of a single controlling apparatus, so that the expense of installation and of supervision can be reduced greatly as compared with the application of an independent temperature control to each furnace, and greater efficiency can be secured. A separate motor of necessity is provided for each furnace and for each motor there is a circuit closer for the main or heavy current which operates the motor, but all of the circuit closers are brought together in one apparatus where they are severally under the control of the several thermoelectric elements which are also of necessity located at the several furnaces. With the main circuit closers are located the auxiliary circuit closers and the other associated devices which are involved in the operation of the automatic temperature regulating means. In the embodiment of the invention illustrated in the drawings the main circuit closers are shown as tilting tubes partly filled with mercury and having internal terminals. The tubes are tilted in succession by continuously operating mechanical means, so that the temperature regulating devices of each furnace may be actuated at regularly and frequently recurring intervals if the necessity for actuation exists. The terminals of the auxiliary circuit closers are connected on one side to the several thermoelectric elements and on the other side to a common device by which the supply of current to the motors is controlled and directed. Other coöperating devices are also connected to the auxiliary circuit closers. The main circuit closers are also connected on one side to the several motors and on the other side to a common circuit closing device by which the sparking is confined to a single point, where it can be made harmless by filling the circuit closing tube with an inert gas. Various other features and purposes of the invention will be more fully explained hereinafter with reference to the accompanying drawings in which is illustrated a suitable embodiment of the invention. In the drawings—

Figure 1 is a detail view illustrating the application of a thermoelectric element and a motor controlled draft slide or damper to a metallurgical furnace of ordinary construction, the furnace being shown in longitudinal section.

Fig. 2 is a diagrammatic view illustrating the electrical connections.

Figs. 3, 4 and 5 are respectively a view in side elevation, a top view and a view in end elevation of the mechanical means employed for tilting the circuit closers and operating the common circuit controller at regular intervals.

Fig. 6 is a detail view in section on the plane indicated by the line A—B of Fig. 3, but on a larger scale.

Fig. 7 is a detail view in section of a portion of the circuit controller shown in Fig. 4, but on a larger scale.

Figs. 8–13 are detail views, partly diagrammatic, illustrating different working positions of the main and auxiliary circuit closers and the circuit controller.

Figure 3:
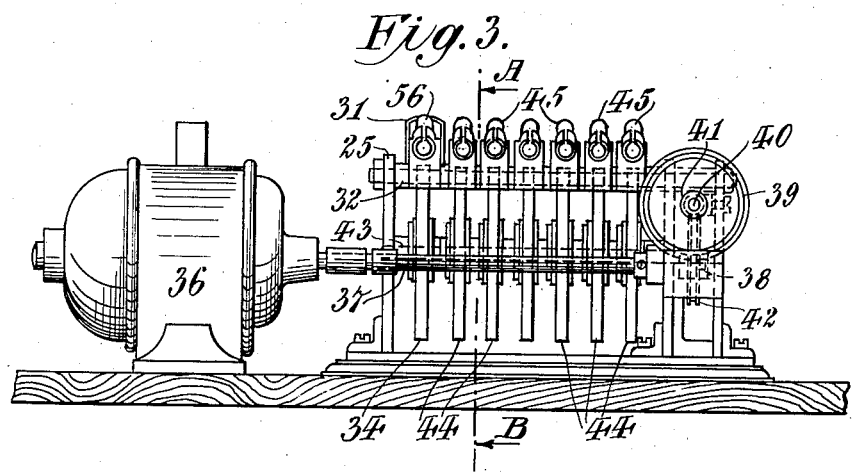

In the application of the invention illustrated in the drawings it is assumed that there is a group of six furnaces (the position of which is indicated at 1, 2, 3, 4, 5 and 6 in Fig. 2), the temperature of which is to be controlled automatically from a central point. One of such furnaces is represented in section in Fig. 1, having a draft channel 7, a combustion chamber 8, a thermoelectric couple or element, of usual construction, at 9, and a draft slide or damper at 10, by the position of which the draft of the furnace and therefore its temperature is regulated. The draft slide or damper 10 is shown as arranged to move vertically and to be counterbalanced by a weight 12. It is connected by a rope which passes over a pulley on the armature shaft of an electric motor 11, so that by rotation of the armature shaft in one direction or the other, according to the direction in which the current flows through the field coils, the draft slide or damper 10 may be raised or lowered, as the draft is to be increased or decreased and the temperature raised or lowered.

Figure 4:
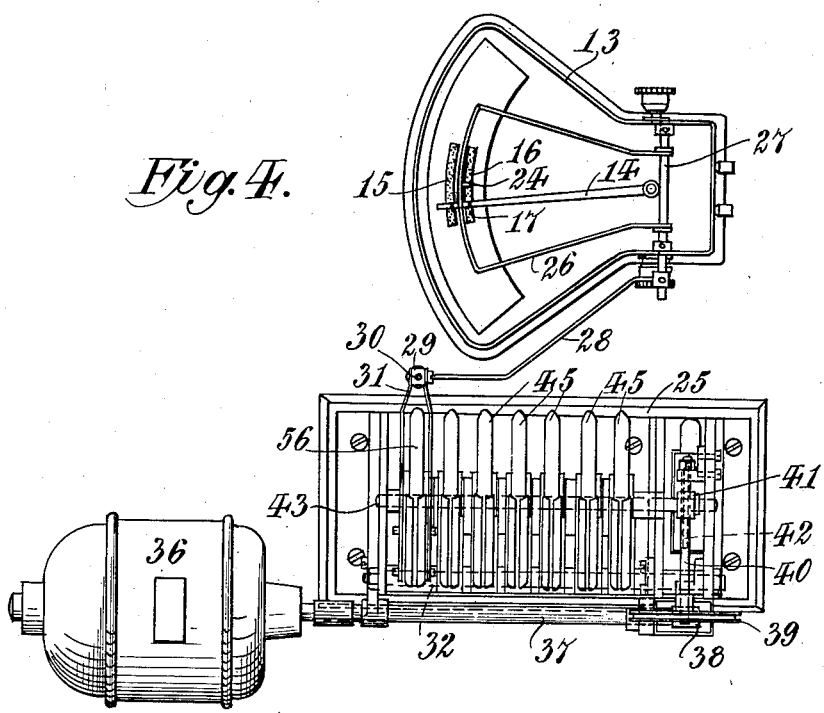

The passage of current to the motor 11 is permitted or prevented and its direction determined by a current controller 13 which is shown in its relation to the system of wiring in Fig. 2 and as to its details of construction in Figs. 4, 5 and 7. It comprises a pivoted arm 14 which, like the pointer of a voltmeter, is made to swing to one side or the other, from its normal middle position, under the influence of a coil indicated at 18 in Fig. 2. The arm 14 is pliable and resilient and carries near its extremity a contact bridge 23 which has, as usual, two connected fingers, as plainly shown in Fig. 7. Arranged to coöperate with the bridge 23 are three elongated terminals, 15, 16, 17, preferably in the form of mercury troughs, the terminal 15 being long enough to be entered by the corresponding finger of the contact bridge 23 at any point in the movement of the arm 14, while the terminals 16 and 17 are adapted to be entered by the other finger of the bridge 23 only when the arm 14 is at one side or the other of its middle position, as the case may be. The two terminals 16 and 17 are separated by a hard rubber plate 24, which is normally cleared by the corresponding finger of the bridge 23, but serves not only to separate the two terminals 16 and 17, but to prevent the bridge from being pressed down into electrical contact with the terminals when the arm 14 is in its middle position. As shown in Fig. 2, one of the main wires, as 19, from the source of current supply, is connected to the long terminal 15, the terminal 16 is connected by a wire 20 to one terminal of each of the motors 11, and the other terminal 17 is connected by a wire 21 to the other terminal of each of the motors 11. By this means current from the source of supply is sent through the field coils of each motor 11 in one direction or another, according to the position of the arm 14 and the bridge 23, when the arm 14 is pressed toward the terminals 15, 16 and 17, as hereinafter described (except when the arm is in its middle position) and when the circuit through the return wire from the motor coils, through one or another of the branch wires 58 and the main return wire 58ª, is completed through the circuit closer 56, 57, as hereinafter described.

The arm 24 and the bridge 23 are pressed toward the terminals 15, 16, 17, at any position of the arm 14 about its axis, by a bail 26 (see Figs. 2, 4 and 7) which overlies the arm 14 and is oscillated at regular intervals as hereinafter described.

All of the parts thus far referred to, except the circuit closer 56, 57, are constructed and arranged substantially as shown and described in the above recited application for Letters Patent Ser. No. 171,608, filed May 29, 1917.

The bail 26 is fixed to a rock shaft 27, to which is also affixed an arm 28 (see Figs. 4 and 5), which rests upon a collar 29 on a rod 30 which depends from an arm 31. The bail is normally sustained by the arm 28, link 30 and arm 31, but when the arm 31 is dropped or tilted from its normal position, as hereinafter described, the bail 26 is permitted to drop by its own weight and the weight of the arm 28 and to press the arm 14 toward the terminals 15, 16, 17 so that the fingers of the bridge 23 shall enter the mercury troughs 15 and 16 or 15 and 17, as the case may be, unless the arm 14 is in its middle position when the corresponding finger of the bridge 23 will rest upon the hard rubber plate 24 and the bridge will be prevented thereby from completing the circuit between the two terminals 15 and 16 or the two terminals 15 and 17.

The arm or bell crank 31 is pivotally mounted on a rod 32 and has a short arm 33 which rests normally on the periphery of a notched cam disk 34. The latter has a number of cam notches 35 corresponding to the number of furnaces to be regulated as to their temperature, and disposed at equal angular distances about the periphery of the disk.

A small motor 36, constantly driven, has on its shaft 37 a worm 38 which meshes with a worm wheel 39 on a shaft 40 (see Figs. 4 and 5). The latter carries a worm 41 which meshes with a worm wheel 42 on a shaft 43 which is mounted in suitable bearings on the frame or casing 25 and carries the notched cam disk 34. By this means the arm 31 is permitted to drop once for each furnace in a complete rotation of the shaft 43, and the main current, when the circuit is closed elsewhere, is directed through the coils of each motor 11 in one direction or the other, according to the position of the arm 14, by the pressure of the bail 26 upon the arm 14 and the closing of the circuit by the bridge 23.

The main or common circuit closer for all of the motors 11 is also operated by the notched cam disk 34, and preferably is so constructed and operated that it closes the main circuit before the gap is bridged by the bridge 23 and opens it after the gap is opened by the bridge 23, whereby the sparking of the main circuit is confined to one point. The main or common circuit closer preferably consists of a tube 56 which is carried by the arm 31 so as to be associated therewith and has two internal terminals 57, one of which is connected to the main supply wire 58ᵃ, while the other is connected to the common or return binding post of the motor 11 through a separate circuit closer for each motor as hereinafter described. The tube 56 is partly filled with mercury, so that when the arm 37 is tilted, as shown in Fig. 11, the mercury runs forward in the tube 56 and closes the gap between the terminals 57, the relative disposition of the parts being such that the gap between the terminals 57 is closed before the fingers of the bridge 23 plunge into the mercury in the troughs 15 and 16 or 15 and 17, as the case may be, whereby the sparking of the main current is confined to this one point. The effect of the sparking at this point may be minimized by filling the tube 56 with an inert gas.

On the shaft 43 are also mounted side by side, a series of cam disks 44, one for each furnace. Each of such cam disks 44 has a long drop 48, the drops or recesses of the several cams being offset with respect one to another (when six furnaces are to be controlled) by an angular distance of 60°, so that the drops or recesses for the several furnaces come into operative position in succession, at regular intervals. Each cam disk 44 controls a mercury switch 45 which, in general, is like the common mercury switch 56, previously referred to. Each such switch 45 consists of a tube mounted on one arm 46 of a bell crank lever which is pivotally mounted on the rod 32, while the other arm 47 coöperates with the corresponding cam disk. Each tube 45 has two chambers 50 and 51, separated by a partition 49 with two separate terminals 52 at the forward end of the chamber 50, two separate terminals 53 at the rear end of the chamber 51 and two separate terminals 54 at the forward end of the chamber 51. Each chamber is partly filled with mercury. When one of the mercury switches 45 is in its normal position, as shown in Figs. 8 and 13, the mercury in the forward chamber 50 closes the gap between the terminals 53, but when a recess or drop 48 of one of the disks 44 reaches its operative position, as indicated in Fig. 9, the mercury switch is permitted to tilt forward by its own weight and the mercury in each chamber flows to the forward end, closing the gap between the terminals 52 in the chamber 50 and closing the gap between the terminals 54 in the chamber 51. Each drop or recess 48 is so positioned with respect to the corresponding notch 35 of the cam disk 34 that the action of each part of the mercury switch or circuit closer 45 follows the action of the mercury switch or circuit closer 56 or 57, the action of each notch 35 being brief, while the action of each drop or recess 48 is continued for a longer time.

The terminals 53 are connected on one side, by wires 62, to one side of each thermoelectric element 9 and on the other side, by wires 63 to the central member of a corresponding push button 61, the right hand member of which is connected through a common reading galvanometer 60 to the return wire 64 through which the several thermoelectric elements are connected on the other side to the coil 18 of the controller arm 14. The push buttons 61, normally open, as to the right hand members, permit the strength of the current of any thermoelectric element to be read off at any time.

The left hand members of the push buttons, against which the central members normally rest, are connected through wires 63 to recording galvanometers, indicated at 55, and thence to the return wire 64.

The terminals 52 are connected on one side through wires 65 and adjustable resistances 59 to the wire 62 and the corresponding sides of the thermoelectric elements 9, the variable resistances 59 permitting, in each instance, the predetermination of the temperature at which the corresponding thermoelectric element shall operate to effect regulation of the furnace damper. The terminals 52 are connected on the other side, by wires 66, to the other side of the coil 18 of the controlling arm 14, whereby each thermoelectric element, when its circuit is closed through the tilting mercury switch, influences the arm 14 of the controlling device to throw the main current through the coils of the corresponding motor 11, in one direction or the other, to increase or decrease the draft as may be necessary.

The terminals 54 are connected on one side, by the wires 58, to the return terminal of the corresponding motor 11, and on the other side to one of the terminals 57 of the switch or circuit closer 56, 57, so that, in order to bring about the operation of any motor, the gap between the terminals 54 is first closed and then the gap between the terminals 57 is closed, while on the other hand the main current is first broken at the gap 57, by the operation of the switch 56, 57, before the gap between the terminals 54 57, of any of the switches 45 is opened. Thereby, as hereinbefore stated, the sparking is confined to the switch 56, 57.

The several instrumentalities are shown in Fig. 2 as separated, but in practice the circuit closer or controller 13, the controlling device 25, 36, the variable resistances 59 and the reading galvanometer 60 are preferably inclosed in one housing, while the recording galvanometer may be separately housed.

In explaining the operation of the devices shown and described, reference may be had particularly to Figs. 1, and 8-13 of the drawings and it may be assumed, with reference to Fig. 8, that the end of the arm 33, of the bell crank lever 31, 33, has just emerged from a notch or recess 35 of the cam disk 34, which rotates anticlockwise, as indicated by the arrow. At this instant, the cam disk 44, which is operatively related to the furnace 1, is in such rotary position that the arm 47, of the bell crank lever 46, 47, is about to enter the long recess or drop 48. At this time, therefore, both the mercury switch or circuit closer 56, 57 and the mercury switch or circuit closer 45, stand in the position indicated in Fig. 8 inclining upwardly toward the right, the motor current being interrupted at the gap between the terminals 54, and at the gap between the terminals 57, while the thermoelectric current is interrupted at the gap between the terminals 52. The thermoelectric current through the corresponding recording galvanometer 55 is closed at the gap between the terminals 53. The circuit is therefore closed from the thermoelectric element 9 through the conductor 62, the electrodes 53, the conductor 63, the corresponding recording galvanometer 55 and the conductor 64 back to the thermoelectric element 9. The bail 26 being raised at this time from the yielding arm 14, the bridge 23 is raised from the terminals 15, 16, 17 and the main current is interrupted at that point.

In the continued rotation of the shaft 43, the drop or recess 48 of the disk 44, which corresponds to the furnace 1, permits the end of the corresponding arm 47 of the bell crank 46 to enter it and the mercury switch or circuit closer to tilt forwardly and downwardly, as shown in Fig. 9. The galvanometer circuit of the thermoelectric element is therefore interrupted at the gap between the terminals 53. The thermoelectric circuit of the controller will be closed from the thermoelectric element 9 through the wire 62, variable resistance 59, wire 65, terminals 52, wire 66, coil 18 and wire 64 back to the thermoelectric element. The pivoted, yielding arm 14 will, therefore, be influenced by the thermoelectric current and its position at one side or the other of the middle point will be determined. At this time the gap in the motor circuit between the terminals 54 is closed, but the motor circuit is interrupted at the gap between the terminals 57 of the switch or circuit closer 56, 57, and it is also interrupted at the terminal 15.

In the further rotation of the shaft 43, as represented in Figs. 10 and 11, the end of the arm 33 eventually enters the next notch or recess 35 of the cam disk 34 and the arm 31 tilts forwardly and downwardly, carrying with it the circuit closer 56, 57. The tilting of the arm 31 lowers the link 33 and permits the bail 26 to rest, by its own weight, on the yielding, resilient arm 14, whereby the arm 14 is pressed downwardly and the bridge 23 (unless the arm happens to be in its middle position) enters the trough 15 and the trough 16 or 17, as the case may be, thereby completing the motor circuit at this point. If the temperature in the furnace happens to be at the desired degree, then the arm 14 will not be swung to one side or the other from its middle position and, therefore, when the bail 26 is permitted to drop, the bridge 23 will rest upon the partition plate 24 and the motor current will therefore still continue to be interrupted through the controller. If, however, the temperature in the furnace has risen above the predetermined degree, the arm 14 will be swung to the right from its middle position, so that the bridge 23 will close the gap between the terminal 15 and the terminal 16, whereby the motor current, completed at the switch 56, 57, will be directed through the coils of the motor 11 in such a direction as to cause the damper or slide 10 to be lowered. On the other hand, if the temperature in the furnace is less than the required degree, the arm 14 will be swung to the left from its middle position and, in like manner, the gap will be closed so as to direct the motor current, when completed at the switch 56, 57, through the motor 11 in a direction to raise the damper or slide 10.

After the bridge 23 has closed the circuit as already described, the tilting of the arm 31 downwardly and forwardly will be continued until the mercury switch or circuit closer 56, 57 has been tilted forwardly and downwardly, as shown in Fig. 11, so as to close the gap between the terminals 57, whereby the motor circuit will be completed at the terminals 57 and the motor current will flow through the wire 58ª, the terminals 57, the terminals 54 and the wire 58 to the coils of the motor 11 and thence, through the wire 20 or the wire 21, to the terminal 16 or 17, as the case may be, and thence through the bridge 23 and the wire 19 back to the source of supply. Thereby the motor will be driven in one direction or the other, as may be required, so as to raise or lower the draft slide or damper to increase or decrease the temperature in the corresponding furnace.

In the further rotation of the shaft 23 the corresponding cam disk 34 continues its movement so that the end of the arm 33 is raised out of the notch or recess 35, the arm 31 is tilted backwardly, and the motor current is interrupted between the terminals 57 of the switch or circuit closer 56, 57. After the backward tilting of the switch 56, 57, has taken place, the continued upward movement of the arm 37 lifts the bail 26 from the yielding, resilient arm 14, so that the latter by its own elasticity, raises the bridge 23 from the terminals in which it has been plunged. Thereby the sparking is confined to the switch 56, 57, in which, as already stated, the effect of the sparking is minimized by the filling of the tube with an inert gas.

Finally, in the further rotation of the shaft 43, the end of the arm 47 also rides out of the drop or recess 48 and the switch 45 is tilted backwardly, whereby the motor circuit, already interrupted at the switch 56 57, is interrupted also at the gap between the terminals 54, the thermoelectric current is interrupted at the gap between the terminals 52, and the thermoelectric circuit for the recording galvanometer is completed between the terminals 53.

As the operation has been described thus far, the explanation has been limited to a single furnace, such as the furnace 1, and its coöperating devices. It will be understood, however, that as soon as the operations have been completed for furnace 1, through the action of the corresponding cam disk 44, the next cam disk 44, corresponding to furnace 2, comes into operation and the same cycle of operations follows with respect to furnace 2. In like manner, the temperature of each furnace of the series is regulated. For the accomplishment of this result it is necessary to provide circuit closers 45 and cam disks 44 in number corresponding with the number of furnaces, but it is necessary to provide only a single current controller 13. Thereby the supervision of the temperature regulator for the entire series of furnaces is centralized, a single reading galvanometer for all of the furnaces being sufficient, while the variable resistances can be assembled at one point and may be combined in the same apparatus with the current controller.

A reciprocal interruption of the circuit of the recording galvanometers 55 and of the controller 13 is prevented by the automatic interruption of the galvanometer circuit at the terminals 53 while the mercury switches are tilted forward.

It will be observed that the continuously rotated shaft 43, with its common cam disk 34 and its series of cam disks 44, and the switches controlled thereby, constitute a current distributer with a common circuit closer for the main current.

It will be understood that the details of construction and arrangement of the several devices employed may be varied to suit different conditions of use or the convenience of the manufacturer and that the invention, except as pointed out in the claims, is not limited to the particular construction and arrangement shown and described herein.

It will further be understood that although the invention has been illustrated and explained herein with particular reference to its use in connection with metallurgical furnaces, it is capable of application to the regulation of temperatures in furnaces of other kinds and in apparatuses of different characters.

I claim as my invention:

1. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current through one or another of the motors, and a common distributer with switches and connections whereby the circuit controller is placed in operative relation with one or another of said thermoelectric elements and with one or another of said motors.

2. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current through one or another of the motors, and a common distributer having means to operate the circuit controller at regular intervals to close the motor circuit through the same, and a plurality of switches to place the circuit controller in operative relation with the thermoelectric elements in succession.

3. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, and a common distributer having means to operate the circuit controller at regular intervals to close the motor circuit through the same and a plurality of switches to place the circuit controller in operative relation with the motors in succession.

4. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, and a common distributer having means to operate the circuit controller at regular intervals to close the motor circuit through the same, a plurality of switches to place the circuit controller in operative relation with the thermoelectric elements in succession and a plurality of switches to place the circuit controller in operative relation with the motors in succession.

5. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, and a common distributer having a plurality of switches to place the circuit controller in operative relation with the thermoelectric elements in succession.

6. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, and a common distributer having a plurality of switches to place the circuit controller in operative relation with the motors in succession.

7. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, and a common distributer having a plurality of switches to place the circuit controller in operative relation with the motors in succession and a single switch operated at regular intervals to close and open the main motor circuit in advance of the closing and opening of each motor circuit by said plurality of switches in succession.

8. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, a reading galvanometer common to all of the thermoelectric elements, and a common distributer having a plurality of switches to place the circuit controller in operative relation with the thermoelectric elements in succession and having a plurality of switches to place the galvanometer in operative relation with the thermoelectric elements in succession.

9. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, a reading galvanometer common to all of the thermoelectric elements, and a common distributer comprising a rotating shaft, a cam disk thereon having a plurality of notches, a plurality of cam disks having each a single depression, the depressions being offset with respect one to another, a switch operated by the first named disk to close the motor circuit through the circuit controller, and a plurality of switches operated respectively by the plurality of cam disks to place the circuit controller in operative relation with the motors in succession.

10. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, a reading galvanometer common to all of the thermoelectric elements, and a common distributer comprising a rotating shaft, a cam disk thereon having a plurality of notches, a plurality of cam disks having each a single depression, the depressions being offset with respect to one another, a switch operated by the first named disk to close the motor circuit through the circuit controller, and a plurality of switches operated respectively by the plurality of cam disks to place the circuit controller in operative relation with the thermoelectric elements in succession.

11. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, a reading galvanometer common to all of the thermoelectric elements, and a common distributer comprising a rotating shaft, a plurality of cam disks thereon having each a single depression, the depressions being offset with respect one to another, and a plurality of switches operated respectively by the plurality of cam disks to place the circuit controller in operative relation with the motors in succession.

12. In an automatic temperature regulator for a plurality of furnaces, the combination of a plurality of thermoelectric elements, a plurality of temperature regulating motors, a circuit controller adapted to be influenced by the condition of one or another of the thermoelectric elements and to direct motor current in one direction or the other through one or another of the motors, a reading galvanometer common to all of the thermoelectric elements, and a common distributer comprising a rotating shaft, a plurality of cam disks thereon having each a single depression, the depressions being offset with respect one to another, a plurality of switches operated respectively by the plurality of cam disks to place the circuit controller in operative relation with the motors in succession, and a plurality of switches operated respectively by the plurality of cam disks to place the circuit controller in operative relation with the thermoelectric elements in succession.

This specification signed this 18th day of February, A. D. 1918.

WALTER WYSS.